(12) United States Patent
Polynkin et al.

(10) Patent No.: US 9,130,340 B1
(45) Date of Patent: Sep. 8, 2015

(54) SYSTEM AND METHOD FOR OUTPUT PORT MANAGEMENT IN SHORT-LENGTH FIBER AMPLIFIERS

(75) Inventors: Pavel Polynkin, Tucson, AZ (US); Alexander Tselikov, Fremont, CA (US)

(73) Assignee: POLAR LASER LABORATORIES, LLC, Tucson, AZ (US)

( * ) Notice: Subject to any disclaimer, the term of this patent is extended or adjusted under 35 U.S.C. 154(b) by 665 days.

(21) Appl. No.: 12/715,150

(22) Filed: Mar. 1, 2010

(51) Int. Cl.
*G02B 6/02* (2006.01)
*H01S 3/067* (2006.01)

(52) U.S. Cl.
CPC ......... *H01S 3/06754* (2013.01); *G02B 6/02038* (2013.01)

(58) Field of Classification Search
CPC ........... G02B 6/02038; G02B 6/02052; G02B 6/381; H01S 3/06754
USPC ............ 359/341.1; 385/31, 33, 34, 35, 39, 52
See application file for complete search history.

(56) References Cited

U.S. PATENT DOCUMENTS

| | | | | |
|---|---|---|---|---|
| 5,917,648 | A * | 6/1999 | Harker | 359/341.3 |
| 6,137,812 | A * | 10/2000 | Hsu et al. | 372/6 |
| 7,379,648 | B1 * | 5/2008 | Brooks et al. | 385/126 |
| 2002/0159736 | A1 * | 10/2002 | Dejneka et al. | 385/127 |
| 2003/0048524 | A1 * | 3/2003 | Chavez-Pirson et al. | 359/333 |
| 2005/0018714 | A1 * | 1/2005 | Fermann et al. | 372/6 |
| 2005/0243409 | A1 * | 11/2005 | Harter et al. | 359/341.1 |
| 2006/0263024 | A1 * | 11/2006 | Dong et al. | 385/125 |
| 2007/0041083 | A1 * | 2/2007 | Di Teodoro et al. | 359/333 |
| 2007/0230884 | A1 * | 10/2007 | Minelly et al. | 385/125 |
| 2008/0030847 | A1 * | 2/2008 | Murison et al. | 359/341.3 |
| 2008/0037604 | A1 * | 2/2008 | Savage-Leuchs | 372/44.01 |

* cited by examiner

*Primary Examiner* — Eric Bolda
(74) *Attorney, Agent, or Firm* — Klein, O'Neill & Singh, LLP

(57) ABSTRACT

The system contains an input fiber section coupled in optical communication with an optical input signal. A length of doped optical gain fiber is optically coupled with the input fiber section. A pumping mechanism is coupled to the doped optical gain fiber. An output port is formed at a distal end of the doped optical gain fiber, wherein the output port is approximately less than twenty centimeters long.

20 Claims, 8 Drawing Sheets

SYSTEM AND METHOD FOR OUTPUT PORT MANAGEMENT IN SHORT-LENGTH FIBER AMPLIFIERS

FIELD

The present disclosure is generally related to laser amplifiers, and more particularly is related to a system and method for output port management in short-length fiber amplifiers.

BACKGROUND

Amplification of short optical pulses in fiber amplifiers is limited by the onset of various nonlinear processes in the fiber. When conventional doped fibers based on fused silica are used for amplification of pulses, several meters of fiber are needed in order to reach sufficient levels of optical gain. Amplification in such long fibers typically results in severe spectral and temporal distortions that eventually lead to pulse breakup The breakup of an ultrashort pulse in a fiber amplifier for the case of anomalous dispersion, which is typical in Large-Mode Area (LMA) fibers at 1.5 μm wavelength, is illustrated in FIG. 1. These broken-up pulse waveforms, although may have appreciable total pulse energy, are of limited utility, because the peak power in these waveforms is limited, and these waveforms cannot be straightforwardly transformed into solitary pulses with high peak power.

There are several nonlinear effects that result in the pulse distortions in fiber amplifiers. Some of them can be more or less non-ambiguously quantified, while the others are not so easy to quantify. The quantifiable detrimental effects include self-phase modulation, Raman scattering, and self-focusing. The effects that are not as easily quantifiable but still very important are related to thermal issues in the amplifying fiber and potential damage to the output fiber end facet by the exiting high-energy laser pulses.

The degree of the nonlinear distortion of the amplified pulse due to self-phase modulation is quantified in terms of the so-called B-integral:

$$B = \frac{2\pi n_2}{\lambda} \int_0^L \frac{P(z)}{A_{core}(z)} \cdot dz, \qquad (1)$$

where $n_2 = 3 \times 10^{-20}$ m²/W is the nonlinear refractive index of the fiber material (which is approximately the same for fused silica and other glasses that conventional optical fibers are made of), $\lambda$ is the operation wavelength, $A_{core}(z)$ is the area of the propagating mode in the fiber, and $P(z)$ is the peak power of the amplified pulses. Both of the last two quantities are functions of z, the longitudinal coordinate along the fiber. The integration is carried out over the entire length of the amplifier, including the gain fiber and whatever length of passive fiber (if any) is connected to the output end of the gain fiber. Such passive fiber may be referred to as a fiber pigtail.

The maximum tolerable value of the B-integral at which the distorted pulses still maintain their shape and can be effectively compressed, is not strictly defined, and this maximum value depends on the exact temporal shape of the amplified pulses. However, more or less independently of the pulse shape, the nonlinear distortions associated with B-integrals of the order of 5 radians or more are, in general, unrecoverable. For the values of the B-integral exceeding this limit, the amplified pulses either breakup into several sub-pulses, or develop a large temporal pedestal. In both of the above cases, such pulses have a limited utility and their original shape cannot be effectively restored (i.e. the amplified pulses cannot be effectively re-compressed in time).

It is important to note that the dominant contribution to the B-integral comes from the end part of the gain fiber and from the entire length of any passive fiber connected to the output of the gain fiber. Connecting such passive fiber to the amplifier output is clearly detrimental to the amplifier operation, but still may be necessary for the purposes of reliable delivery of the amplified pulses or for pulse re-compression.

It is customary to define the so-called effective length of a fiber amplifier $L_{eff}$ such that the value of the B-integral in (1) can be re-written as:

$$B = \frac{2\pi n_2}{\lambda A_{core}} P_{out} \cdot L_{eff} \qquad (2)$$

$$L_{eff} = L_{eff}^{gain} + L_{pigtail} \qquad (3)$$

In the formula (3) above, $L_{eff}^{gain}$ is the effective length of the gain fiber, which, as pointed out above, is shorter than the entire length of the gain fiber, and $L_{pigtail}$ is the entire length of the passive fiber connected to the output of the gain fiber (the pigtail). This definition implicitly implies that the effective area in the propagating lightwave is the same in the both gain fiber and the fiber pigtail. For fiber types that have different beam areas, the lengths $L_{eff}^{gain}$ and $L_{pigtail}$ in the formula (3) need to be weighed by factors proportional to the mode areas in the gain and fiber pigtail, respectively.

Several ways of mitigating the nonlinearity problem in pulsed fiber amplifiers have been developed in the past. From the above formula (3) for B-integral, the value of this integral (and consequently the severity of the nonlinear pulse distortions) can be reduced in three ways: by increasing the size of the propagating fiber mode, by decreasing the peak power of the pulses, and by reducing the effective length of the amplifier.

The area of the propagating fiber mode can be increased by using the so-called Large-Mode Area (LMA) fibers that can either be based on the conventional step-index geometry, or on various microstructure designs. Under certain conditions, multimode gain fibers can be used for the amplification of diffraction-limited optical signals. In the cases above, increasing the core size comes at a price of higher bending losses, and the maximum core size is ultimately limited by the degradation of the beam quality produced by the fiber-laser system. In addition, the mode coupling due to micro-bending from the fundamental to higher-order modes in a multimode LMA fiber grows rapidly with decreasing the outside fiber diameter. Consequently, in order to reduce the mode coupling, LMA fibers used for pulse amplification typically have outer diameters in excess of one millimeter. Such wide fibers may be referred to as "rod-type" fibers. "Rod-type" active fibers are stiff and in general are not pliable, which makes their integration into practical compact fiber-laser systems problematic.

Reducing the peak power of pulses inside the amplifier is the essence of the Chirped-Pulse Amplification (CPA) technique. In a CPA laser system, the pulses to be amplified are first stretched in time domain, which reduces their peak power. The stretched pulses are then amplified followed by their re-compression using free-space diffraction-grating compressors. This powerful approach is the workhorse of the modern high-energy laser technology, but applying this approach in a practical fiber amplifier system is not easy. The main limitation of the CPA technique as applied to fiber amplification, is associated with the limited choices for a pulse stretcher. Even though the generation of millijoule-level pulse energies in fiber-based CPA systems has been recently reported, stretching ratios of the order of 1:5000, as well as the necessity to carefully balance higher-order dispersion between stretcher and compressor, which is essential for operation of these systems, require bulky and cumbersome free-space stretcher/compressor arrangements.

Another approach of reducing the value of the B-integral is by reducing the effective length of the fiber amplifier. At a given doping concentration and core size of the amplifying fiber, the length of the amplifier determines the values of the optical gain and optical pulse power attainable from the amplification. For conventional doped fibers based on fused silica glass, the doping concentration is limited to a fraction of one percent (by weight). Accordingly, the typical length of large-mode area amplifiers made of these fibers is in the range from few to few tens of meters. The value of the peak pulse power attainable from such amplifiers is severely limited by the fiber nonlinearities and can be quantified by the formula (3) above. At the same time, packaging these amplifiers is relatively straightforward, as the meters-long gain fiber can be coiled and effectively cooled. FIG. 2 is an illustration of a large-mode area amplifier 110 with a gain fiber 112 coiled, as is known in the prior art. In addition, fused silica, the common material from which these fibers are made, is very hard and allows for an appropriate preparation of the exit facet of the amplifier (via end-face polishing, for example). Furthermore, since the gain fiber is several meters long, a dedicated passive fiber section can be added to the output of the gain fiber, without making the entire effective length of the amplifier substantially longer.

Recently, several new types of optical fibers have been developed. These fibers are made of special types of optical glasses that can be highly doped with rare-earth oxides. These novel fiber types include phosphate fibers and phospho-silicate glasses. The attainable doping concentrations in these glasses are, by at least an order of magnitude, higher compared to those in the conventional doped fibers made of fused silica glass. Due to the high concentration of doping in these glasses, the length of the fiber amplifier can be reduced, while maintaining the high values of the optical gain and output optical power. Thus by using short-lengths of these highly-doped fibers for amplification of optical pulses, the value of the B-integral can be reduced in proportion to the fiber length.

In spite of the clear advantages brought about by using short and highly doped fibers in pulse amplification applications, their use in practice is not straightforward. First, these fibers are typically inferior to fused silica in terms of mechanical rigidity and friendliness to common fiber-processing techniques. Second, in order to bring real advantage in terms of the reduced nonlinearity, the length of the gain fiber likely needs to be below fifty centimeters. At this short length, proper fiber preparation and packaging, as well as providing a proper arrangement for optical pumping the gain fiber become even more complicated.

Various optical pumping methods that have been developed for ordinary doped fibers have been adapted for use with highly-doped fibers. These doping methods include the core pumping via a wavelength-division-multiplexing (WDM) coupler, pumping through a groove cut in the side surface of the fiber, and side pumping via a multi-fiber arrangement that rely on the evanescent-field coupling between the active fiber and, in general, several passive pump-delivery fibers. FIG. 3 is an illustration of a side pumping arrangement 210 via multiple fibers that relies on the evanescent-field coupling between the active fiber 212 and the passive pump-delivery fibers 214, as is known in the prior art.

Thus, a heretofore unaddressed need exists in the industry to address the aforementioned deficiencies and inadequacies.

SUMMARY

Embodiments of the present disclosure provide a system and method for amplifying an optical signal. Briefly described, in architecture, one embodiment of the system, among others, can be implemented as follows. The system contains an input fiber section coupled in optical communication with an optical input signal. A length of doped optical gain fiber is optically coupled with the input fiber section. A pumping mechanism is coupled to the doped optical gain fiber. An output port is formed at a distal end of the doped optical gain fiber, wherein the output port is approximately less than twenty centimeters long.

The present disclosure can also be viewed as providing methods for making an optical amplifier. In this regard, one embodiment of such a method, among others, can be broadly summarized by the following steps: coupling an input fiber section in optical communication with an optical input signal; optically coupling a length of doped optical gain fiber with the input fiber section; a pumping the doped optical gain fiber; and optically coupling an output port with the doped optical gain fiber, wherein the output port is approximately less than twenty centimeters long.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale. Instead emphasis is being placed upon illustrating clearly the principles of the present disclosure. Moreover, in the drawings, like reference numerals designate corresponding parts throughout the several views.

DETAILED DESCRIPTION

Figure 1:
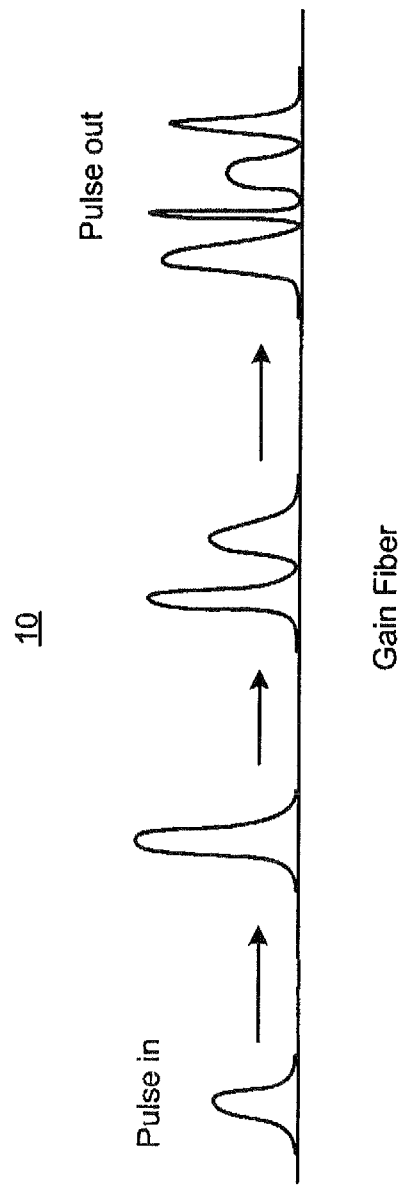
FIG. 1 is an illustration of the breakup of an ultrashort pulse in a fiber amplifier for the case of anomalous dispersion, as is known in the prior art.
Figure 2:
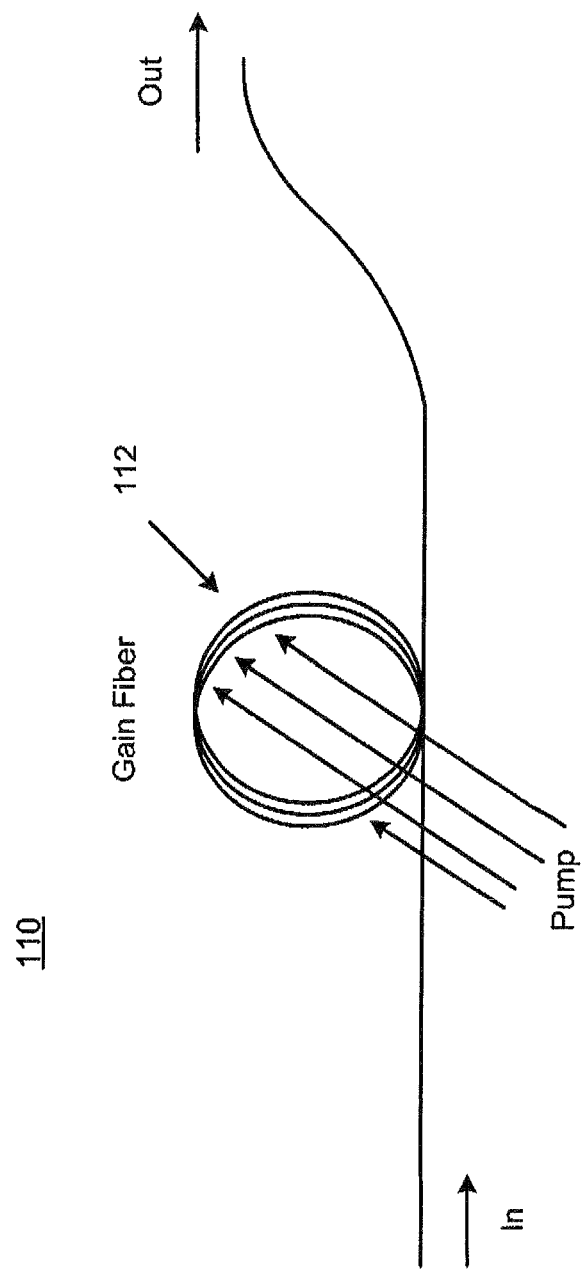
FIG. 2 is an illustration of a large-mode area amplifier with a gain fiber coiled, as is known in the prior art.
Figure 3:
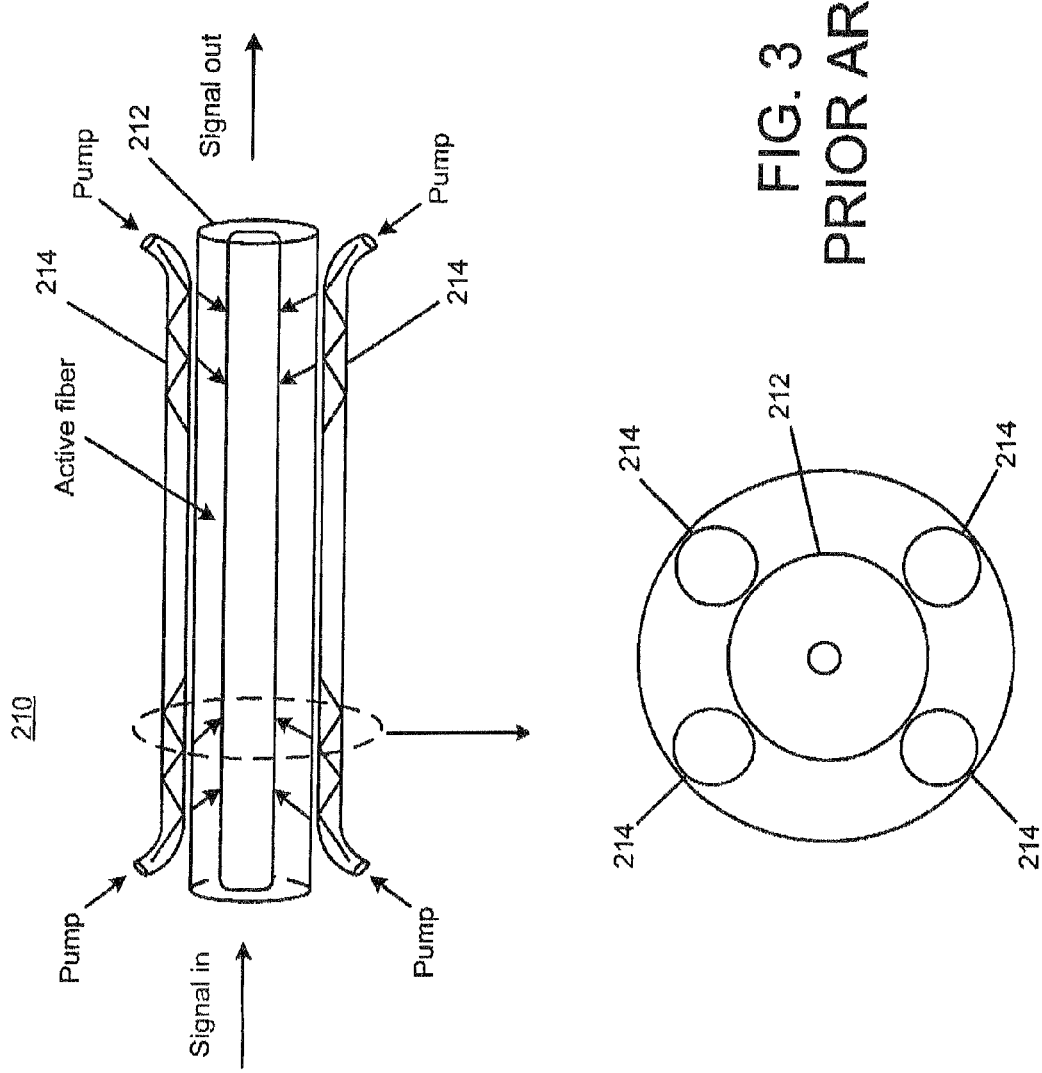
FIG. 3 is an illustration of a side pumping arrangement via multiple fibers that relies on the evanescent-field coupling between the active fiber and the passive pump-delivery fibers, as is known in the prior art.
Figure 4:
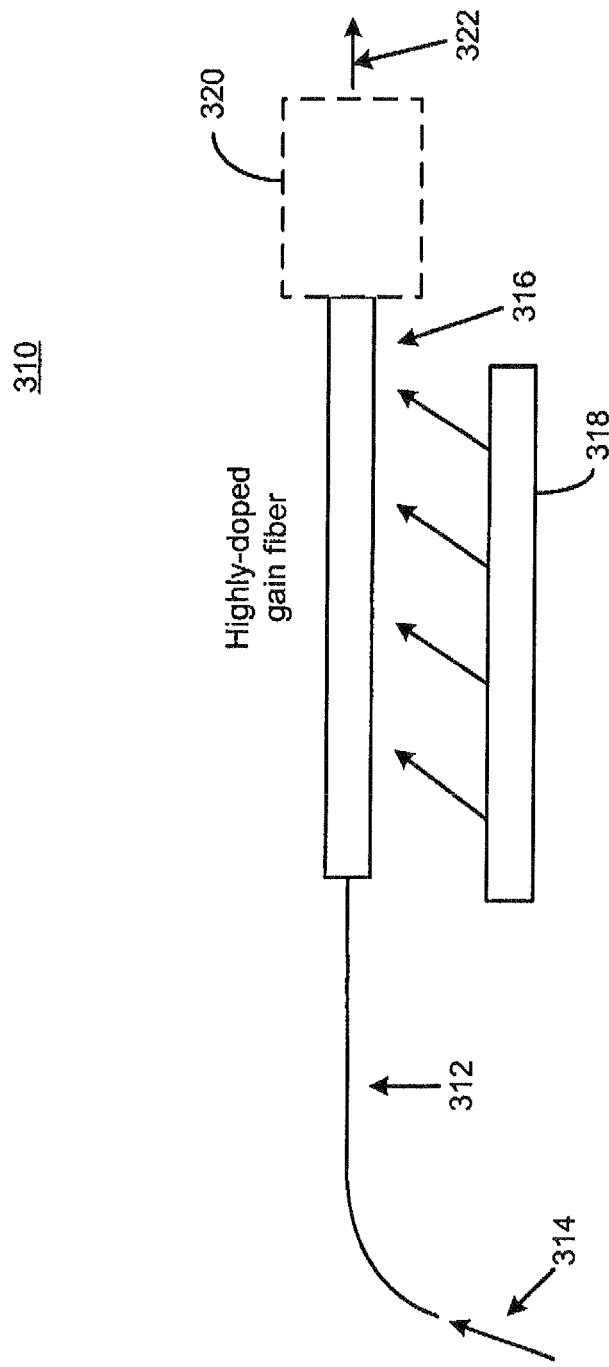
FIG. 4 is an illustration of a cross-section of an optical amplifier, in accordance with all the exemplary embodiments of the present disclosure.

FIG. 4 is an illustration of a cross-section of an optical amplifier 310, in accordance with all the exemplary embodiments of the present disclosure. An input fiber section 312 coupled in optical communication with an optical input signal 314. A length of doped optical gain fiber 316 optically coupled with the input fiber section 312. A pumping mechanism 318 coupled to the doped optical gain fiber 316. An output port 320 is in optical communication with the doped optical gain fiber 316. The output port 320 is approximately less than about twenty centimeters long. An amplified optical signal 322 exits the output port 320.

The optical amplifier 310 consists of a short-length of a highly-doped fiber that generates optical gain, a passive input fiber section 312 that delivers the optical input signal 314 to the optical gain fiber 316, pumping mechanism 318 in order to optically pump the optical gain fiber 316, and an output port 320 of the amplifier for out-coupling of the amplified optical signal 322. The various embodiments of the present disclosure are aimed at managing the overall length of the optical gain fiber 316 plus the output port 320.

The passive input fiber section 312 and the optical input signal 314 are constructed in a manner conforming with the knowledge of one having ordinary skill in the art. The passive input fiber section 312 is made of an un-doped fiber. The optical gain fiber 316 is in optical contact with the passive input fiber section 312 and the output port 320. The passive input fiber section 312 may be fusion spliced to the optical gain fiber 316. The optical gain fiber 316 may be, for example, one to thirty centimeters long. The optical gain fiber 316 may be doped with any combination of $Er^{3+}$, $Yb^{3+}$, $Tm^{3+}$, $Pr^{3+}$, $Ho^{3+}$, and $Nd^{3+}$ ions. The optical gain fiber 316 may have a combined doping concentration above 1% by weight. The optical gain fiber 316 may have an index guiding gain fiber. The index guiding gain fiber may be single-moded or multi-moded. The optical gain fiber 316 may include a gain guiding gain fiber, preferably a polarization maintaining gain fiber.

The output port 320 is constructed in the way that may facilitate the safety of operation of the optical amplifier 310 against optical damage, may allow for stable and reliable packaging of the output port 320, and potentially adds functionality via focusing, defocusing or collimating the amplified optical signal 322. In addition, the construction of the output port 320 may facilitate the reduction of the overall effective length of the optical amplifier 310.

The optical gain fiber 316 is optically pumped. FIG. 4 illustrates the optical pumping that is provided by the pumping mechanism 318. The pumping mechanism 318 illustration is not intended to identify one specific mode of pumping the optical gain fiber 316. This pumping may be core or cladding pumped by at least one simple-mode fiber-pigtailed laser diodes. The optical gain fiber also may be cladding-pumped by at least one laser diodes using a V-groove pump-coupling technique or by at least one multimode fiber-pigtailed laser diode via a multi-fiber arrangement based on an evanescent field coupling between a plurality of pump-delivery fibers and the optical gain fiber. Pumping also may be provided by a cladding-pumping scheme via a multi-fiber optical arrangement, by injecting the pump light into the gain fiber via a groove etched or cut into the side-surface of the gain fiber, or by using a fused WDM coupler. Any means of pumping known to those having ordinary skill in the art may be adopted as the pumping mechanism 318 and is considered to be within the scope of the present disclosure.

Figure 5:
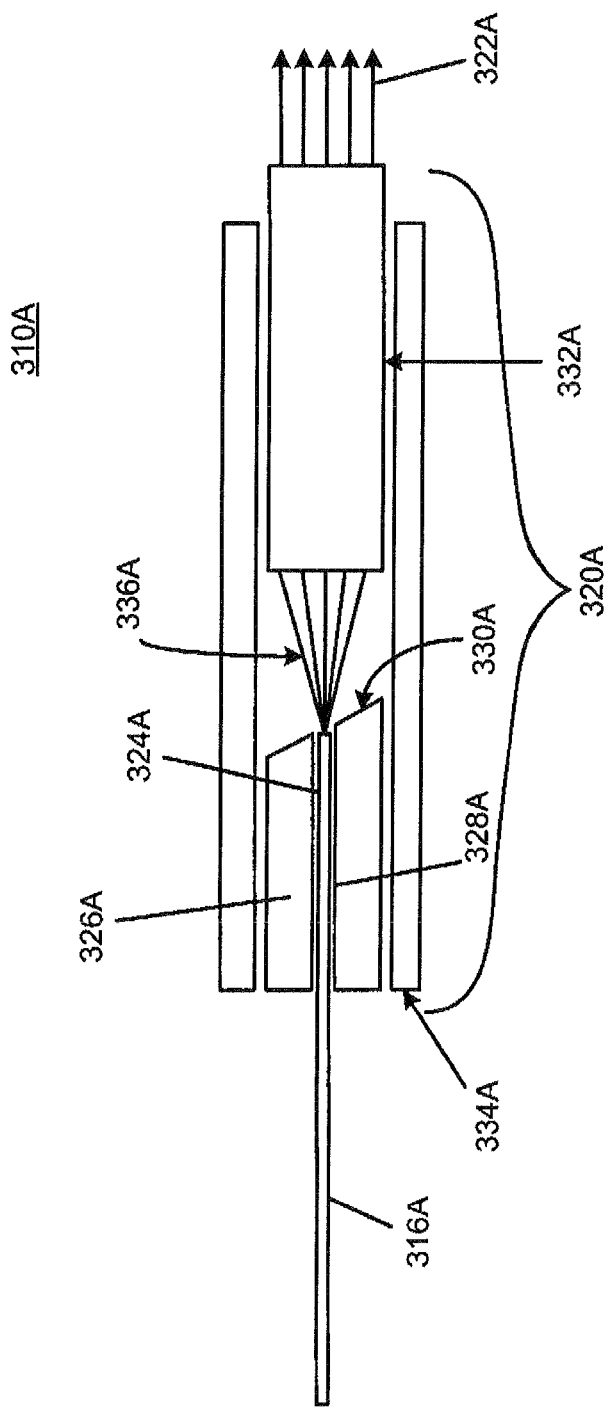
FIG. 5 is an illustration of a cross-section of a portion of the optical amplifier of FIG. 4, in accordance with a first exemplary embodiment of the present disclosure.

FIG. 5 is an illustration of a cross-section of a portion of the optical amplifier 310A of FIG. 4, in accordance with a first exemplary embodiment of the present disclosure. FIG. 5 illustrates the output port 320A of the optical amplifier 310A may be constructed by inserting an output end 324A of the optical gain fiber 316A into either a precision ferrule or capillary tube (collectively, reference number 326A) and bonding it to an inside surface 328A of the ferrule or the capillary tube 326A (the inside surface 328A may be referenced as an inner bore). An output surface 330A of the ferrule or the capillary tube 326A may be optically polished and may be anti-reflection coated. A lens 332A may be attached to the ferrule or the capillary tube 326A directly or via an intermediate ceramic or glass tube 334A. The lens 332A, which may comprise a focusing, de-focusing or collimatory lens may be used for focusing, de-focusing, or collimating an output 336A of the optical gain fiber 316A, as desired, to complete the amplified optical signal 322A. The lens 332A, which preferably comprises a molded glass lens may be anti-reflection coated on either or both of an input side and an output side. If desired, the lens may further comprise a gradient-index (GRIN) lens.

Figure 6:
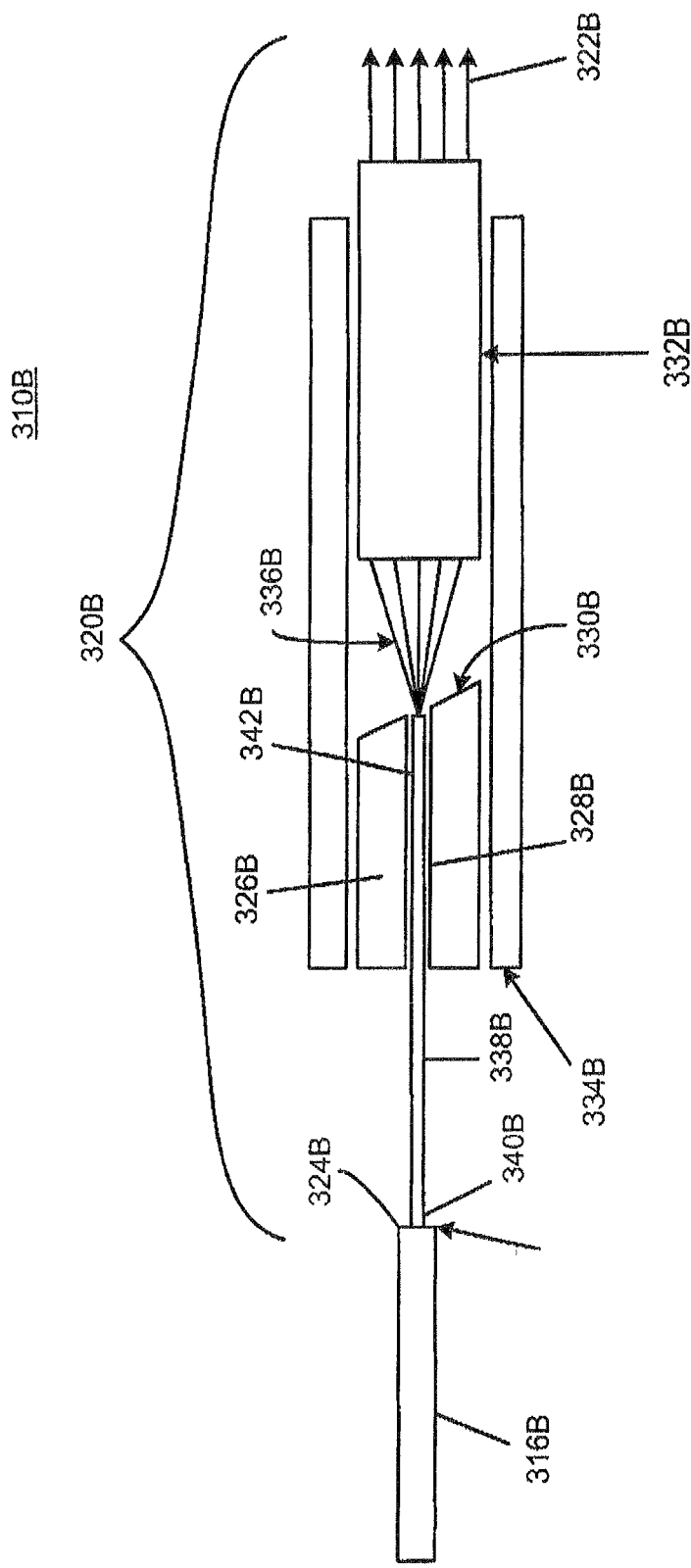
FIG. 6 is an illustration of a cross-section of a portion of the optical amplifier of FIG. 4, in accordance with a second exemplary embodiment of the present disclosure.

FIG. 6 is an illustration of a cross-section of a portion of the optical amplifier 310B of FIG. 4, in accordance with a second exemplary embodiment of the present disclosure. Certain types of heavily-doped optical gain fibers 316B are too brittle and mechanically not strong enough for the direct insertion of the output end 324B of the optical gain fiber 316B into either a precision ferrule or capillary tube (collectively, reference number 326B). In addition, these brittle types of optical gain fiber 316B may not allow for a high-quality optical polished surface on the exit facet of the optical gain fiber 316B to be manufactured. In such cases, the output port 320B includes a short length of a passive fiber 338B whose input end 340B is in optical contact with the output end 324B of the optical gain fiber 316B, as shown in FIG. 6.

FIG. 6 illustrates the output port 320B of the optical amplifier 310B may be constructed by inserting an output end 342B of the passive fiber 338B into either the precision ferrule or capillary tube 326B and bonding it to an inside surface 328B of the ferrule or the capillary tube 326B. An output surface 330B of the precision ferrule or capillary tube 326B may be optically polished and may be anti-reflection coated. A lens 332B may be attached to the ferrule or the capillary tube 326B directly or via an intermediate ceramic or glass tube 334B. The lens 332B may be used for focusing, de-focusing, or collimating an output 336B of the passive fiber 338B, as desired, to complete the amplified optical signal 322B. The lens 332B may be anti-reflection coated on either or both of an input side and an output side.

The input end 340B of the passive fiber 338B section may be fusion spliced with the output end 324B of the optical gain fiber 316B. The output end 342B of the passive fiber 338B is prepared so that it can withstand high values of the average and peak power of the output 336B, and can be appropriately packaged. The output end 342B of the passive fiber 338B may be inserted into the ferrule or the capillary tube 326B and bonded to it. The output end 342B of the passive fiber 338B together with the ferrule or the capillary tube 326B may be straight or angle polished. An anti-reflection coating may be deposited on the output surface of the ferrule or the capillary tube 326B together with the inserted passive fiber 338B.

Figure 7:
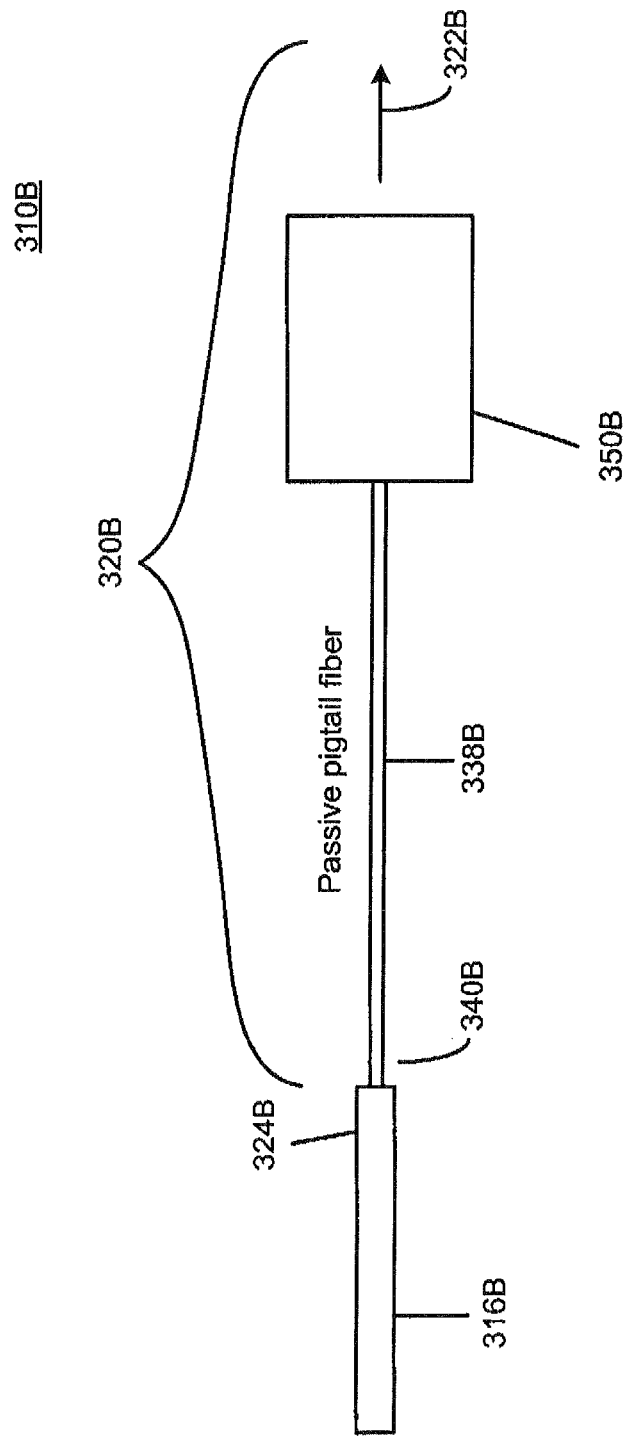
FIG. 7 is an illustration of a side view of the portion of the optical amplifier of FIG. 6, in accordance with the second exemplary embodiment of the present disclosure.

FIG. 7 is an illustration of a side view of the portion of the optical amplifier 310B of FIG. 6, in accordance with the second exemplary embodiment of the present disclosure. The entire assembly of the second exemplary embodiment of the output port 320B, including the passive fiber 338B with the output end 342B bonded to the inside surface 328B of the ferrule or the capillary tube 326B, the output surface 330B of the ferrule or the capillary tube 326B polished, and possibly with the lens 332B attached to the ferrule or the capillary tube 326B, may be pre-made. Many of the elements of the output port 320B may be contained within an output port enclosure 350B, with the passive fiber 338B protruding from one side of the output enclosure 350B. Then the input end 340B of the passive fiber 338B may be fusion-spliced to the output end 324B of the optical gain fiber 316B. The total effective length of the optical gain fiber 316B plus the length of the passive fiber 338B is reduced to an extent allowable by the assembly process and/or fusion-splicing equipment. The output port 320B, or elements thereof, may be formed to mate with an optical connector, such as those commonly used in fiber optics FC/PC, FC/SPC, or FC/UPC connectors.

Figure 8:
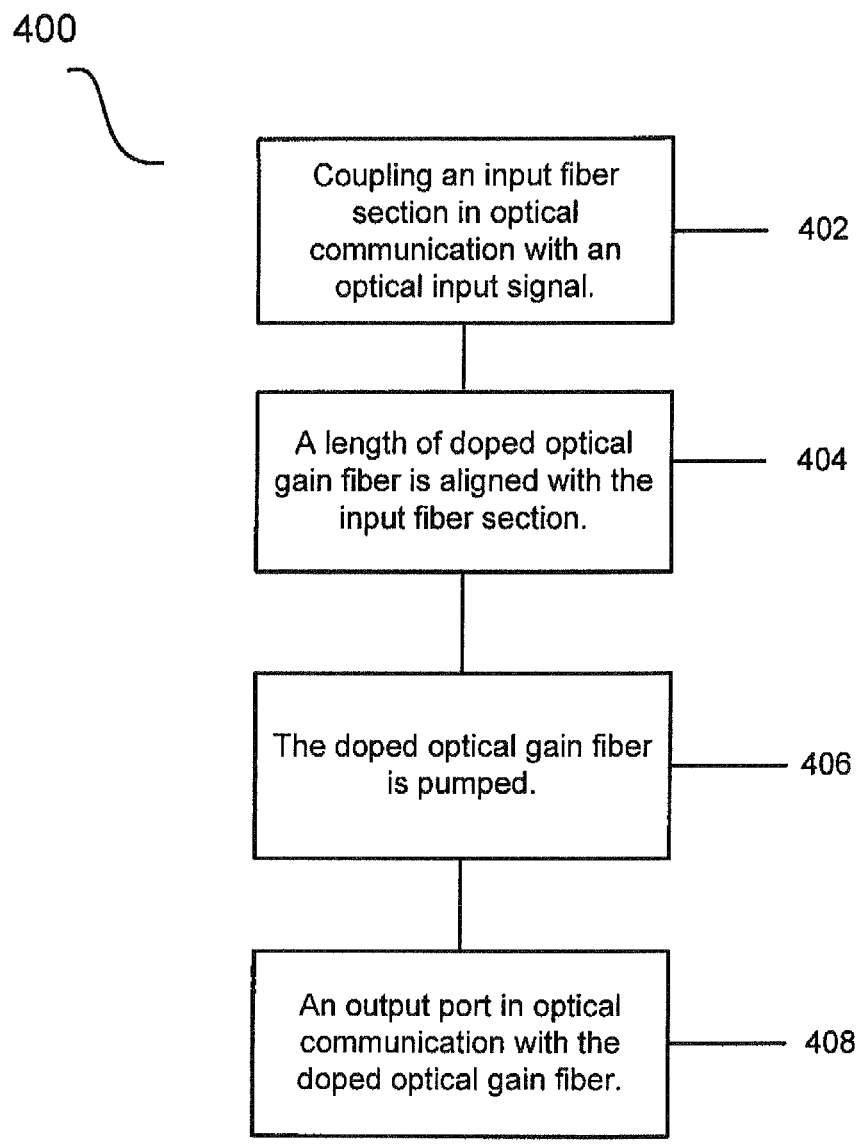
FIG. 8 is an illustration of a flowchart illustrating a method of making an optical amplifier of FIG. 4, in accordance with the first exemplary embodiment of the present disclosure.

FIG. 8 is an illustration of a flowchart 400 illustrating a method of making an optical amplifier of FIG. 4, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 402, coupling an input fiber section in optical communication with an optical input signal. A length of doped optical gain fiber is optically coupled with the input fiber section (block 404). The doped optical gain fiber is pumped (block 406). An output port in optical communication with the doped optical gain fiber (block 408). The output port is approximately less than twenty centimeters long.

It should be emphasized that the above-described embodiments of the present disclosure, particularly, any "preferred" embodiments, are merely possible examples of implementations, merely set forth for a clear understanding of the principles of the disclosed system and method. Many variations and modifications may be made to the above-described embodiments of the disclosure without departing substantially from the spirit and principles of the disclosure. All such modifications and variations are intended to be included herein within the scope of this disclosure and protected by the following claims.

What is claimed is:

1. An optical amplifier comprising:
a single mode input fiber section for delivering an optical input signal;
a length of a highly-doped glass based optical gain fiber optically coupled with the input fiber section, the optical gain fiber being doped with any combination of Er3+, Yb3+, Tm3+, Pr3+, Ho3+, and Nd3+ ions, with a combined doping concentration above 1% by weight, the optical gain fiber comprising a single mode index guiding gain fiber;
a side pumping mechanism having pre-made pump light delivery fiber pigtails coupled to the highly-doped glass based optical gain fiber;
an output port in optical communication with the highly-doped glass optical gain fiber, wherein the output port is less than about twenty centimeters long, wherein the output port comprises a pre-made fiber-pigtailed collimator, a pre-made fiber-pigtailed beam focuser, or a pre-made fiber-pigtailed optical connector, and the fiber pigtail of the fiber-pigtailed collimator, the fiber pigtail of the fiber-pigtailed beam focuser, or the fiber pigtail of the fiber-pigtailed optical connector, as the case may be, is in optical contact with an output end of the highly-doped glass based optical gain fiber; and
wherein the highly-doped glass based optical gain fiber, pre-made fiber pigtails of the fiber-pigtailed collimator, fiber-pigtailed focuser or fiber-pigtailed connector, and the pre-made pump light delivery fiber pigtails are co-packaged together in a single bundle.

2. The optical amplifier of claim 1 wherein the optical gain fiber is between about 1 centimeter and 30 centimeters long.

3. The optical amplifier of claim 1, wherein the input fiber section comprises a passive fiber.

4. The optical amplifier of claim 1, wherein the input fiber section is connected to the optical gain fiber by a fusion splice.

5. The optical amplifier of claim 1, wherein the pigtail fiber comprises a length of a passive optical fiber.

6. The optical amplifier of claim 5, wherein the passive fiber is single-mode, with a mode diameter closely matching that of a fundamental mode of the optical gain fiber.

7. The optical amplifier of claim 5, wherein the passive fiber is a step-index multi-mode fiber.

8. The optical amplifier of claim 5, wherein the passive fiber is a gradient-index (GRIN) fiber.

9. The optical amplifier of claim 5, wherein the passive fiber is a polarization maintaining fiber.

10. The optical amplifier of claim 5, wherein the passive fiber is a coreless fiber.

11. The optical amplifier of claim 5, wherein the optical contact between the optical gain fiber and the passive fiber is provided by a fusion splice.

12. The optical amplifier of claim 5, wherein an output end of the passive fiber is inserted into and attached to an inner bore of either a ferrule or a capillary tube.

13. The optical amplifier of claim 12, wherein an output facet of the ferrule or the capillary tube, together with the output end of the passive fiber is optically polished to form a polished surface.

14. The optical amplifier of claim 13, wherein the polished surface is at a right angle with respect to the axis of the ferrule or the capillary tube.

15. The optical amplifier of claim 13, wherein the polished surface is at a non-right angle with respect to the axis of the ferrule of the capillary tube.

16. The optical amplifier of claim 13, wherein the ferrule or the capillary tube together with the output end of the passive fiber is incorporated into an optical connector.

17. The optical amplifier of claim 13, wherein an anti-reflection coating is deposited on the polished surface.

18. The optical amplifier of claim 12, further comprising a lens placed at a fixed distance from the output end of the passive fiber.

19. The optical amplifier or claim 18, further comprising an aligning tube bonded to the ferrule or the capillary tube and to the lens, whereby the lens and the output end of the passive fiber are kept at a fixed distance relative to each other.

20. A method of making an optical amplifier of claim 1, the method comprising:
pre-making side pumping fiber pigtails;
pre-making input and output fiber pigtails, with the output fiber pigtail having a length less than about 20 centimeters;

coupling a single mode input fiber section in optical communication with a length of highly doped optical gain fiber comprised of a single mode index guiding gain fiber, the optical gain fiber being doped with any combination of $Er^{3+}$, $Yb^{3+}$, $Tm^{3+}$, $Pr^{3+}$, $Ho^{3+}$, and $Nd^{3+}$ ions, with a combined doping concentration above 1% by weight; and co-packaging said side pumping fiber pigtails, said input and output fiber pigtails, and said length of highly optical gain fiber.

* * * * *